No. 757,531. Patented April 19, 1904.

UNITED STATES PATENT OFFICE.

UTLEY WEDGE, OF ARDMORE, PENNSYLVANIA.

PREPARING IRON PYRITES FOR DESULFURIZATION.

SPECIFICATION forming part of Letters Patent No. 757,531, dated April 19, 1904.

Application filed August 21, 1903. Serial No. 170,352. (No specimens.)

*To all whom it may concern:*

Be it known that I, UTLEY WEDGE, a citizen of the United States, residing in Ardmore, Pennsylvania, have invented certain Improvements in Preparing Iron Pyrites for Desulfurization, of which the following is a specification.

The object of my invention is to provide for the effective formation into blocks or briquets of the relatively fine particles of iron pyrites commonly termed "pyrites fines" or "pyrites smalls" in order that they may be treated in a roasting furnace or kiln for the elimination of sulfur in the same manner that larger bodies of pyrites usually known as "rock ore" or "lump ore" are now treated. This object I attain by the employment of sulfate of iron as a means of binding together said relatively small particles of pyrites, as I find that when such binder is employed the blocks or briquets are so hard and offer such resistance to disintegration that they can be conveniently handled and treated in the same manner as the rock ore, the binding ingredient moreover importing into the block or briquet no foreign element which would interfere with the free elimination of the sulfur therefrom or so adulterate the sulfurous-acid gas as to retard or prevent the subsequent conversion of the same into sulfuric acid.

In carrying out my invention I take the relatively small particles of pyrites either in the natural state or after the ore has been leached for the extraction of the copper therefrom in case the pyrites is originally of a cuprous character, and I add thereto oxid of iron, preferably employing for this purpose the cinder resulting from the roasting of the pyrites for the driving off of the sulfur therefrom, this cinder being used either in the form in which it issues from the furnace or after it has been leached for the extraction of the copper therefrom, in case the pyrites was originally of a cuprous character, leached cinder, or, as it is commonly called, "purple ore," being preferred because it is moist from the leaching and is in finely-divided form. To this mixture I add sulfate of iron and dilute sulfuric acid, the sulfate of iron, owing to its plastic character, serving to retain the particles of pyrites and oxid in the form of the block or briquet to which they are reduced by pressure, while the chemical action of the sulfuric acid upon the oxid of iron produces a sulfate of iron, which I find has the effect of hardening the block more effectively and more rapidly than would the admixture of the pyrites with sulfate of iron alone, the result being that the blocks or briquets are so hard and tenacious that they are not disintegrated by handling or by the heat and pressure to which they are subjected in the desulfurizing furnace or kiln.

Blocks or briquets of pyrites having lime as a binder are objectionable, because the lime absorbs a certain percentage of the sulfur and forms therewith sulfate of lime, while the use of cement or plaster-of-paris is impracticable, because the briquets fall to pieces under the action of heat, and therefore cannot be effectively handled in the ordinary desulfurizing furnace or kiln. If a binder having a hydrocarbon base is used, the carbon introduces such an element of adulteration into the sulfurous-acid gas as to retard the subsequent conversion of said gas into sulfuric acid.

All of the objections above noted are overcome by my invention, and I am thus enabled to render available large quantities of leached ore, pyrites fines or pyrites smalls, which now, owing to the difficulty of treatment, require to be roasted in mechanical furnaces or added to rock ore in rock-ore kilns or burners or which must otherwise be regarded as waste.

When roasted in mechanical furnaces, there is a considerable escape of dust, which is objectionable, because it blocks or chokes the flues or towers used in connection with the furnace, even when special settling or dust-collecting chambers are employed. When added to rock ore, the fine pyrites interferes with the proper operation of the furnace by obstructing the draft of the same.

The sulfate of iron which I prefer to employ in carrying out my invention is the impure sulfate having a certain percentage of free sulfuric acid, which constitutes a by-product in the concentration of sulfuric acid or which accumulates as a sediment in the chambers, pipes, towers, and tanks in the sulfuric-acid process, since I find that this is even better for the purpose than a commercially-pure sulfate of iron for the reason that it contains certain impurities, such as sulfate of lead, which add to its plasticity.

While I prefer in carrying out my invention to combine this sulfate of iron with the sulfate of iron directly produced in the mixture by the action of the sulfuric acid upon oxid of iron, it will be evident that the pyrites may be mixed with sulfate of iron alone in some cases or in other cases may be combined only with the sulfate of iron resulting from the action of the sulfuric acid upon the iron oxid, the mixture in this case being preferably permitted to remain for a certain length of time in order to "ripen" or form the desired quantity of sulfate of iron before being pressed into the form of blocks or briquets.

The particular quantity of each ingredient employed may vary, depending upon the desired "tempering" of the composite mass—that is say, the required degree of hardness and tenacity of the finished briquets—the rule being that an excess of oxid of iron softens the briquet, while increase in the quantity of sulfate of iron hardens the briquet. Drying or heating of the briquets also has the effect of hardening the same.

Having thus described my invention, I claim and desire to secure by Letters Patent—

1. The mode herein described of preparing relatively small particles of iron pyrites for desulfurization, said mode consisting in combining said particles with sulfate of iron and forming them into blocks or briquets, substantially as specified.

2. The mode herein described of preparing small particles of iron pyrites for desulfurization, said mode consisting in mixing the same with iron oxid and sulfuric acid and then forming the mass into blocks or briquets, substantially as specified.

3. The mode herein described of preparing small particles of iron pyrites for desulfurization, said mode consisting in mixing the same with iron oxid and sulfuric acid, and, after reaction of acid and oxid has produced a sufficient quantity of sulfate of iron, forming the mass into blocks or briquets, substantially as specified.

4. The mode herein described of preparing relatively small particles of iron pyrites for desulfurization, said mode consisting in combining said particles with sulfate of iron and sulfate of lead and forming them into blocks or briquets, substantially as specified.

5. The mode herein described of preparing small particles of iron pyrites for desulfurization, said mode consisting in mixing the pyrites with sulfate of iron, oxid of iron and sulfuric acid, and then forming the mass into blocks or briquets, substantially as specified.

6. The mode herein described of preparing small particles of iron pyrites for desulfurization, said mode consisting in mixing the pyrites with sulfate of iron, sulfate of lead, oxid of iron and sulfuric acid, and then forming the mass into blocks or briquets, substantially as specified.

7. The mode herein described of preparing small particles of iron pyrites for desulfurization, said mode consisting in mixing the pyrites with sulfuric acid and oxid of iron, in the form of pyrites cinder, and then forming the mass into blocks or briquets, substantially as specified.

8. The mode herein described of preparing small particles of iron pyrites for desulfurization, said mode consisting in mixing the pyrites with sulfuric acid and oxid of iron, in the form of leached pyrites cinder or purple ore, and then forming the mass into blocks or briquets, substantially as specified.

9. The mode herein described of preparing small particles of iron pyrites for desulfurization, said mode consisting in mixing the pyrites with sulfate of iron, sulfuric acid and iron oxid in the form of pyrites cinder, and then forming the mass into blocks or briquets, substantially as specified.

10. The mode herein described of preparing small particles of iron pyrites for desulfurization, said mode consisting in mixing the pyrites with sulfate of iron, sulfate of lead, sulfuric acid and iron oxid in the form of pyrites cinder and then forming the mass into blocks or briquets, substantially as specified.

11. The mode herein described of preparing small particles of iron pyrites for desulfurization, said mode consisting in mixing the pyrites with sulfate of iron, sulfuric acid and iron oxid in the form of leached pyrites cinder or purple ore and then forming the mass into blocks or briquets, substantially as specified.

12. The mode herein described of preparing small particles of iron pyrites for desulfurization, said mode consisting in mixing the pyrites with sulfate of iron, sulfate of lead, sulfuric acid and iron oxid in the form of leached pyrites cinder or purple ore and then forming the mass into blocks or briquets, substantially as specified.

13. As a new article of manufacture a block or briquet composed of relatively small particles of iron pyrites and a binder consisting of sulfate of iron, substantially as specified.

14. As a new article of manufacture a block or briquet composed of relatively small particles of iron pyrites and a binder consisting of sulfate of iron mixed with oxid of iron, substantially as specified.

15. As a new article of manufacture a block or briquet composed of relatively small particles of iron pyrites and a binder consisting of sulfate of iron mixed with sulfate of lead, substantially as specified.

16. As a new article of manufacture a block or briquet composed of relatively small particles of iron pyrites and a binder consisting of sulfate of iron mixed with sulfate of lead and oxid of iron, substantially as specified.

In testimony whereof I have signed my name to this specification in the presence of two subscribing witnesses,

UTLEY WEDGE.

Witnesses:
 F. E. BECHTOLD,
 JOS. H. KLEIN.